(12) United States Patent
Eisenhauer et al.

(10) Patent No.: US 10,087,902 B2
(45) Date of Patent: Oct. 2, 2018

(54) POWER LIMITING GENERATOR CONTROL UNIT (GCU)

(71) Applicant: Sikorsky Aircraft Corporation, Stratford, CT (US)

(72) Inventors: Mark P. Eisenhauer, Milford, CT (US); Frederick L. Bourne, Litchfield, CT (US); Matthew Fogarty, Monroe, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 161 days.

(21) Appl. No.: 15/151,935

(22) Filed: May 11, 2016

(65) Prior Publication Data

US 2016/0332740 A1 Nov. 17, 2016

Related U.S. Application Data

(60) Provisional application No. 62/159,629, filed on May 11, 2015.

(51) Int. Cl.
*B64D 31/00* (2006.01)
*F02N 11/08* (2006.01)
*F02C 9/00* (2006.01)

(52) U.S. Cl.
CPC ............ *F02N 11/0866* (2013.01); *F02C 9/00* (2013.01); *B64D 2221/00* (2013.01); *F02N 2200/06* (2013.01); *F05D 2220/329* (2013.01); *F05D 2260/85* (2013.01)

(58) Field of Classification Search
CPC .... F02N 11/0866; F02N 2200/06; F02C 9/00; F05D 2220/329; F05D 2260/85; B64D 2221/00; B64D 31/00
See application file for complete search history.

(56) References Cited

U.S. PATENT DOCUMENTS

| | | | | |
|---|---|---|---|---|
| 4,967,096 A * | 10/1990 | Diemer | ................... | F02N 11/04 290/38 R |
| 5,325,043 A * | 6/1994 | Parro | ........................ | H02P 9/42 322/23 |
| 5,550,456 A * | 8/1996 | Shekhawat | ............. | H02P 9/305 322/17 |
| 5,899,411 A * | 5/1999 | Latos | ...................... | B64D 33/00 244/53 A |
| 7,274,978 B1 * | 9/2007 | Carroll | ................... | B64C 39/024 244/190 |
| 7,622,817 B2 | 11/2009 | El-Refaie et al. | | |
| 8,319,369 B2 | 11/2012 | Rozman et al. | | |
| 8,564,914 B2 * | 10/2013 | Eisenhauer | ............ | H02H 7/268 361/20 |
| 8,742,605 B1 | 6/2014 | Wilhide et al. | | |
| 8,866,318 B2 | 10/2014 | Langford et al. | | |

(Continued)

*Primary Examiner* — Assres H Woldemaryam
(74) *Attorney, Agent, or Firm* — Cantor Colburn LLP

(57) ABSTRACT

A method of operating an electrical system of an aircraft is provided. The method includes initiating a cross-start action for cross-starting a non-operative engine using a generator of an operative engine, entering a power limiting mode of a generator control unit (GCU) of the operative engine, remaining in the power limiting mode for a duration of the cross-start action and returning to the non-power limiting mode of the GCU of the operative engine upon completion of the cross-start action.

15 Claims, 6 Drawing Sheets

(56) References Cited

U.S. PATENT DOCUMENTS

| | | | |
|---|---|---|---|
| 2013/0233977 A1* | 9/2013 | Smiley | B64C 27/12 |
| | | | 244/53 A |
| 2014/0150446 A1 | 6/2014 | Eisenhauer et al. | |
| 2015/0105970 A1* | 4/2015 | Harrigan | B64C 27/001 |
| | | | 701/32.8 |

* cited by examiner

POWER LIMITING GENERATOR CONTROL UNIT (GCU)

CROSS-REFERENCE TO RELATED APPLICATIONS

This application claims benefit of priority of U.S. Provisional Application No. 62/159,629 filed on May 11, 2015, the disclosure of which is incorporated by reference.

BACKGROUND OF THE INVENTION

The subject matter disclosed herein relates to an aircraft and, more particularly, to an aircraft with a power limiting generator control unit (GCU).

Typically, an aircraft's electrical power system includes a DC power generator as a primary power source with batteries serving as an emergency backup power source. The DC power generator is used to start an aircraft's engine and, once started, the engine provides for power generation through the power generators resulting in electrical power being supplied to load busses in the electrical power system. A typical twin engine generator power system would consist of two generators, one per engine. A first generator would be used for starting the first engine and for providing, for example, electrical power to left hand busses. A second generator would be used for starting the second engine and providing power to right hand busses. In the event that the first generator was to fail, the power system would compensate by providing power to all buses through the remaining generator. In some cases, the remaining load busses can overload the remaining generator, resulting in its failure as well. Most power systems, therefore, also include a battery backup for providing supplemental power to if one or both of the generators fail. The battery feeds power to the emergency busses and the essential busses.

In some cases, such as failure of a single engine in a twin engine aircraft, it may be necessary to use the generator for the working engine as a starter for the non-working engine in a cross-starting scenario. This can apply extreme loads on the working engine and reduces its surge margin and acceleration capabilities. That is, modern engines have limited generator available loads and any power taken off the generator typically costs 3 to 5 times as much power as if it was taken off of the power turbine.

BRIEF DESCRIPTION OF THE INVENTION

According to one aspect of the invention, a method of operating an electrical system of an aircraft is provided. The method includes initiating a cross-start action for cross-starting a non-operative engine using a generator of an operative engine, entering a power limiting mode of a generator control unit (GCU) of the operative engine, remaining in the power limiting mode for a duration of the cross-start action and returning to the non-power limiting mode of the GCU of the operative engine upon completion of the cross-start action.

In accordance with additional or alternative embodiments, the entering of the power limiting mode includes reducing an amount of power that can be pulled off of the operative engine and deriving from a battery associated with the operative engine any additionally needed power for the cross-start action exceeding power that can be drawn from the operative engine.

In accordance with additional or alternative embodiments, the method further includes load dumping during the duration of the cross-start action.

In accordance with additional or alternative embodiments, the method further includes deriving power from an auxiliary power unit (APU) for the cross-start action.

In accordance with additional or alternative embodiments, a secondary method includes limiting output power when recharging a depleted battery.

In accordance with additional or alternative embodiments, the secondary method includes registering a return to a normal non-power limited GCU mode, calculating a recharging time, entering a secondary power limiting GCU mode in response to the registration, remaining in the secondary power limiting GCU mode for a recharging duration and returning to a normal non-power limited GCU mode upon completion of the recharging.

In accordance with additional or alternative embodiments, the secondary method includes load dumping during the duration of the cross-start action.

In accordance with additional or alternative embodiments, the secondary method includes deriving power from an auxiliary power unit (APU) for the cross-start action In accordance with additional or alternative embodiments, the method includes discretely reducing a generator voltage to maintain a generator power output limit.

In accordance with additional or alternative embodiments, the method includes discretely reducing a generator voltage from about 28 volts to as low as 16 volts and from 16 volts to as low as 10 volts.

In accordance with additional or alternative embodiments, the method includes gradually reducing a generator voltage to maintain a generator power output limit.

According to yet another aspect of the invention, an aircraft is provided and includes an airframe, main and tail rotors disposed on the airframe, engines supportively disposed on the airframe to drive rotations of the main and tail rotors and an electrical system configured to initiate a cross-start action for cross-starting a non-operative one of the engines using a generator of an operative one of the engines, to enter a power limiting mode of a generator control unit (GCU) of the operative engine, to remain in the power limiting mode for a duration of the cross-start action and to return to the non-power limiting mode of the GCU of the operative engine upon completion of the cross-start action.

In accordance with additional or alternative embodiments, the entry of the power limiting mode by the electrical system includes reducing an amount of power that can be pulled off of the operative engine and deriving from a battery associated with the operative engine any additionally needed power for the cross-start action exceeding power that can be drawn from the operative engine.

In accordance with additional or alternative embodiments, the electrical system is further configured to recharge a depleted battery.

In accordance with additional or alternative embodiments, the recharging includes registering a return to a normal non-power limited GCU mode, calculating a recharging time, entering a secondary power limiting GCU mode in response to the registration, remaining in the secondary power limiting GCU mode for a recharging duration and returning to a normal non-power limited GCU mode upon completion of the recharging.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a power limiting generator control unit (GCU) is provided. The power limiting GCU operates by limiting the electrical loads applied to a generator by reducing the regulated generator voltage level while simultaneously regulating the power output to the desired limit. The outside regulation loop is for power output and the inside regulation loop is for voltage. The field current is varied to maintain the voltage that provides the desired regulated power. As the voltage is dropped the battery picks up the loads during cross start or decreases the load during charging. Unloading the engine gas turbine allows for improved surge margins and engine acceleration performance.

Figure 1:
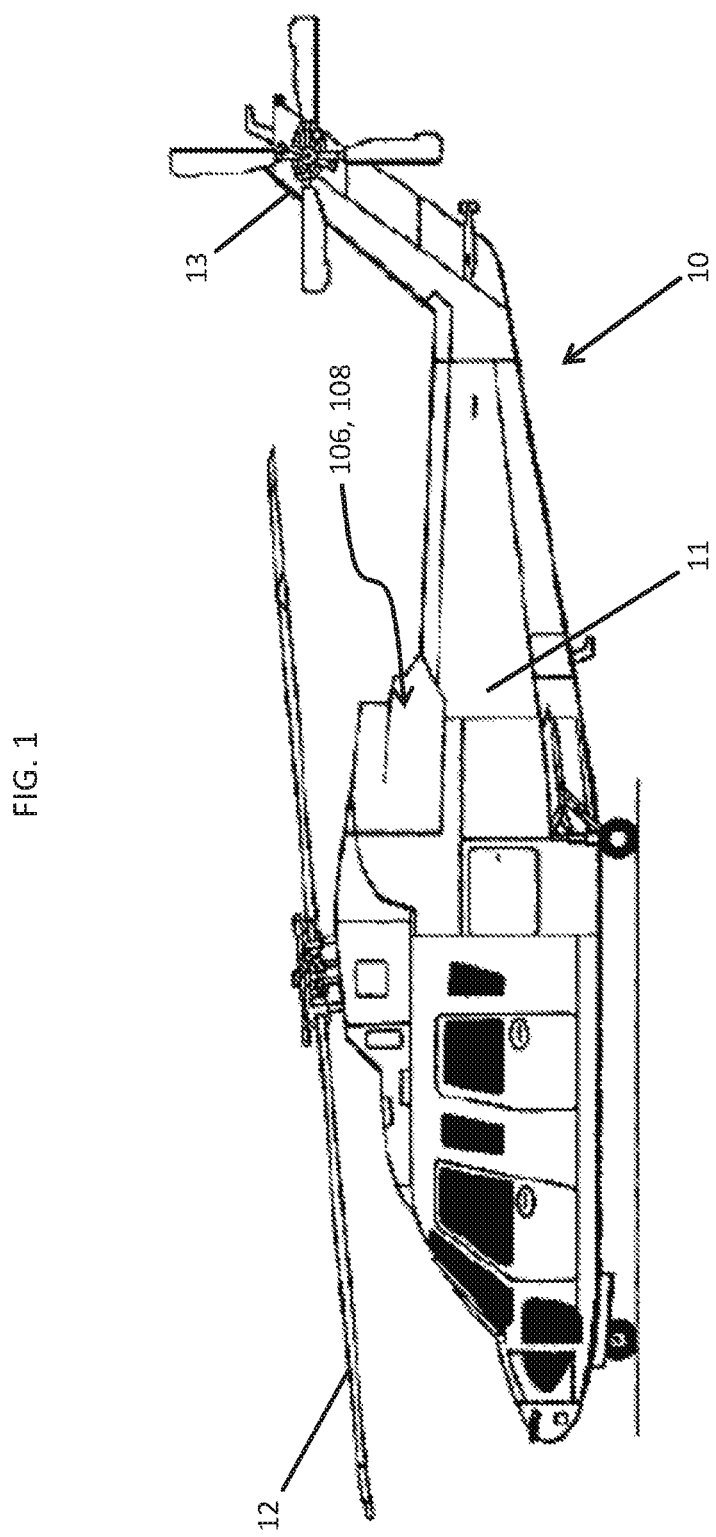
FIG. 1 is an aircraft in accordance with embodiments.

With reference to FIG. 1, an aircraft 10 is provided and may be configured as a plane or as a rotorcraft, such as a helicopter or a coaxial, counter-rotating helicopter. In any case, the aircraft 10 may include a fuselage or airframe 11 with a nose section and a tail section, a main rotor 12 operably disposed at an upper section of the airframe 11 and a tail rotor 13 operably disposed at the tail section. The aircraft 10 may further include engines 106, 108 and 30 and an electrical system 100 (see FIG. 2). The engines 106, 108 are supportively disposed at or near the upper section of the airframe 11 and are configured to drive rotations of the main rotor 12 and the tail rotor 13 to generate lift, thrust and yaw control for the aircraft 10.

Figure 2:
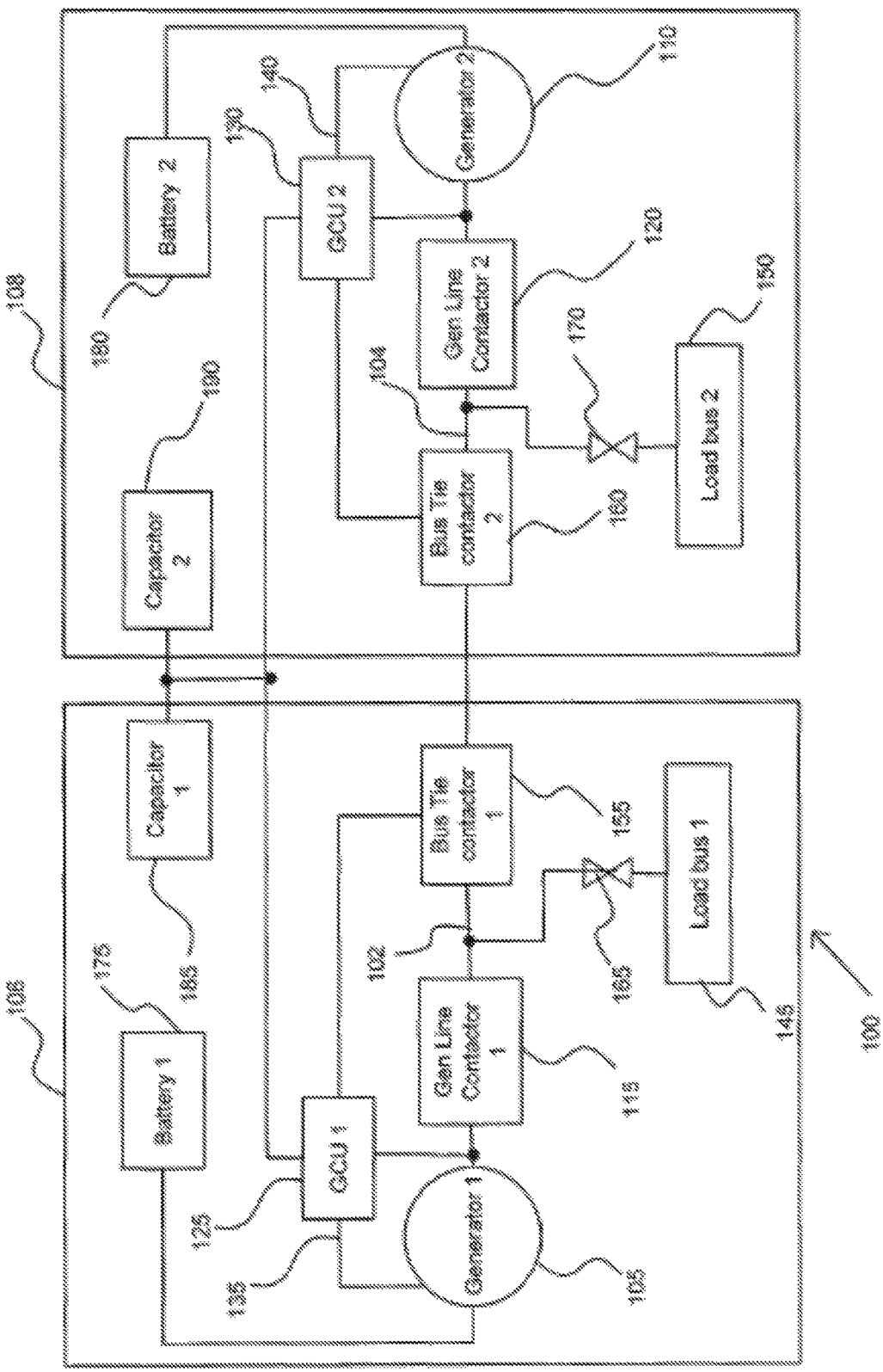
FIG. 2 is a schematic diagram illustrating an electrical system of an aircraft in accordance with embodiments.

With reference to FIG. 2, the electrical system 100 includes the engines 106, 108. The engines 106, 108 include direct current (DC) generators 105, 110 connected in parallel to DC bus circuits 102, 104 for selective power applications. The generators 105, 110 may be permanent magnet generators or three-phase AC generators having rectifiers for receiving power and for distributing 28 VDC power to the DC bus circuits 102, 104 respectively. In particular, the engine 106 includes DC generator 105, which feeds electrical power to the main circuit 102 and to equipment connected to the load bus 145 while engine 108 includes the DC generator 110, which feeds electrical power to the main circuit 104 and to equipment connected to the load bus 150.

The generator 105 is connected to a generator control unit (GCU) 125 and generator line contactor 115 while the generator 110 is connected to GCU 130 and generator line contactor 120. The GCUs 125, 130 are microprocessor controlled devices and include an overvoltage sensing circuit that regulates the output voltage being supplied by the respective generators 105, 110. In particular, the GCU 125 continually regulates the output voltage being supplied by the generator 105 by feeding the output voltage back to an excitation circuit (not shown) in the generator 105 with a return line 135. Additionally, the GCU 125 may disconnect the generator 105 from the main circuit 102 if the voltage exceeds a preset level. Similarly, GCU 130 continually regulates the output voltage being supplied by the generator 110 and feeds the output voltage back to an excitation circuit (not shown) in the generator 110 with a return line 140. Additionally, the GCU 130 may disconnect the generator 110 from the main circuit 104 if the voltage exceeds a preset level.

Each GCU 125, 130 energizes its respective generator line contactor 115, 120 for electrically connecting the generators 105, 110 to the main circuits 102, 104 when the generator outputs are within specified limits. The GCUs 125, 130 are preprogrammed to sense when a short circuit occurs in the load busses 145, 150 and supply hold-up power to the generators 105, 110 in order to clear the fault caused by the short circuit. In embodiments, the electrical system 100 includes backup batteries 175, 180 that are connected to the respective generators 105, 110 through diode switches (not shown) in order to excite the field of the generators 105, 110 during a ground fault. In operation, in the event of a short circuit, the GCUs 125, 130 provide power to the generators 105, 110 through capacitor banks 185, 190 respectively as well as energizing the bus tie contactors 155, 160. The capacitor banks 185, 190 provide voltage to the generators 105, 110 in order to maintain the voltage level of the generator's field when the respective batteries 175, 180 are not available in order to clear the fault.

In accordance with embodiments, the load buses 145, 150 may include respective current limiting devices 165, 170 such as, for example a fuse or a thermal "trip" device in order to provide fault protection on each of the load buses 145, 150 during a short circuit. Other current limiting devices having a different $I^2t$ rating may also be utilized in embodiments.

As shown in FIG. 2, the capacitor banks 185, 190 are coupled to bus circuit 200 with the GCUs 125, 130 connected to each other by way of the bus circuit 200. Thus, in an event where engine 108 becomes non-operative during a flight, it is possible that generator 105 can be used by GCU 125 to restart engine 108 during the in-flight condition. Conversely, in an event where engine 106 becomes non-operative during a flight, it is possible that generator 110 can be used by GCU 130 to restart engine 106 during the in-flight condition. These actions are collectively referred to as "cross-starting" incidents and except as provided for herein can result in extreme loads being applied to the operating engine such that the operating engine's surge margin in reduced and the operating engine's acceleration capability is reduced.

Figure 3:
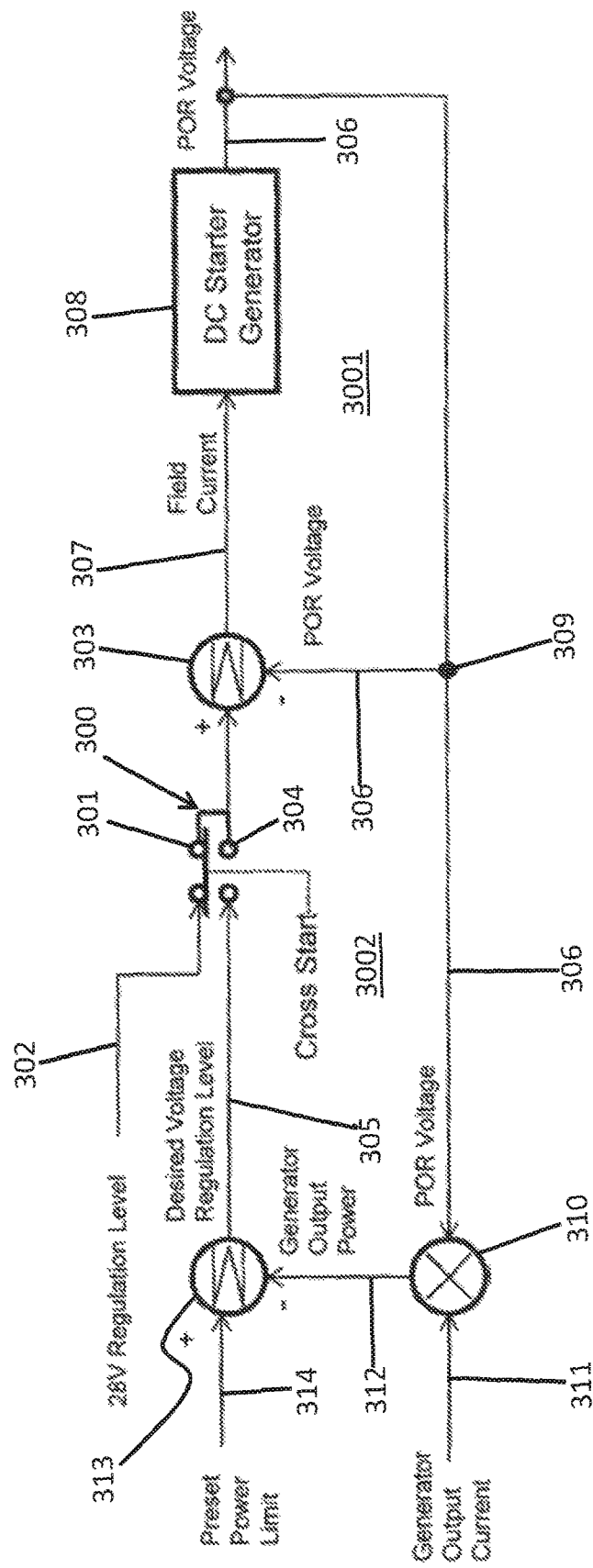
FIG. 3 is a schematic diagram illustrating a generator power limiting control diagram in accordance with embodiments.

With reference FIG. 3, a generator power limiting control diagram for use in a cross-start incident is illustrated. As shown in FIG. 3, during normal operation, a cross-start switch 300 is actuated toward 28 volt regulation level terminals 301, which sends a 28 volt current ("first") signal 302 to a first summation unit/converter 303. However, during the cross-start incident, the cross-start switch 300 is actuated toward desired voltage regulation level terminals 304 such that a desired voltage regulation level ("second") signal 305 is directed to the first summation unit/converter 303.

The first summation unit/converter 303 is receptive of a point of regulation (POR) voltage ("third") signal 306 that effectively reduces the voltage of the first signal 302 or the second signal 305 such that an output of the first summation unit/converter 303 is a reduced voltage field current ("fourth") signal 307. The fourth signal 307 is then directed to a DC starter generator (i.e., the generator 105/110) 308 of the non-operating engine (in the cross-start incident case). The starter generator 308 then outputs the third signal 306 and issues the third signal 306 to the corresponding GCU 125/130 and the splitter 309.

At the splitter 309, the third signal 306 is directed to the first summation unit/converter 303 to thereby complete an inside regulation loop 3001 for voltage and to the multiplier 310. The multiplier 310 is thus receptive of the third signal 306 as well as a generator output current ("fifth signal") 311 from the generator 105/110 by which the third signal 306 is converted into a generator output power ("sixth") signal 312 as an output of the multiplier 310. The sixth signal 312 is then directed to a second summation unit/converter 313, which is receptive of a preset power limit ("seventh") signal 314. At the second summation unit/converter 313, the sixth signal 312 and the seventh signal 314 are combined to reduce the seventh signal 314 and to thereby generate the second signal 305, which is then directed to the desired voltage regulation level terminals 304 to complete an outside regulation loop 3002 for power.

Figure 4:
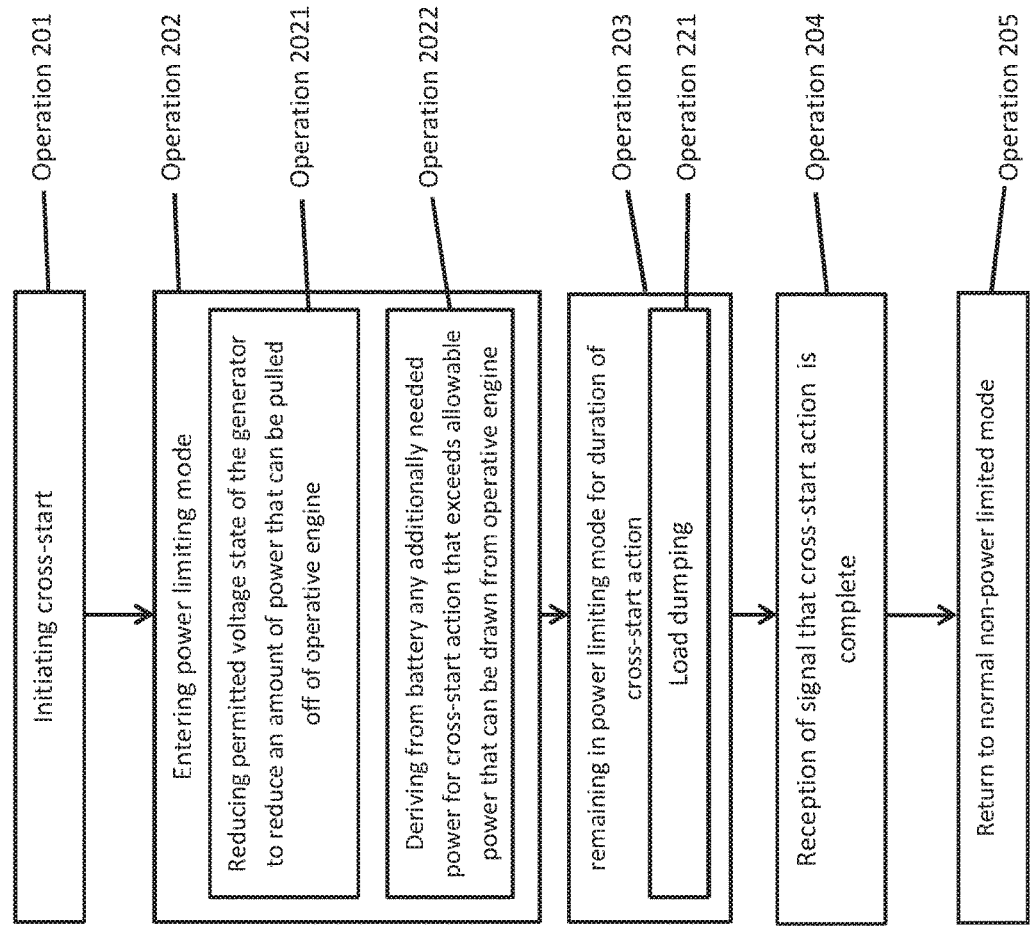
FIG. 4 is a flow diagram illustrating a method of operating an aircraft electrical system in accordance with embodiments.

With reference to FIG. 4, a GCU power limiting method is provided and includes reception of a signal indicating that a cross-start action is initiated (operation 201) in order to cross-start a non-operative engine with the generator of an operative engine during an in-flight condition. The method continues with the GCU of the operative engine entering a power limiting mode (operation 202) in response to the receipt of the signal and remaining in the power limiting mode for the duration of the cross-start action (operation 203). The method concludes upon reception of a signal indicating that the cross-start action is complete (operation 204) and a return of the GCU to its normal non-power limited mode (operation 205). In the entering of the power limiting mode by the GCU of operation 202, it is understood that the GCU is normally instructed to vary a voltage/current applied to the generator as long as a predefined power limit is not exceeded. In this case, however, the GCU of the operative engine reduces a permitted voltage state of the generator in order to reduce an amount of power that can be pulled off of the operative engine (operation 2021). The GCU then derives from the battery any additionally needed power for the cross-start action that exceeds the allowable power that can be drawn from the operative engine (operation 2022).

Figure 5:
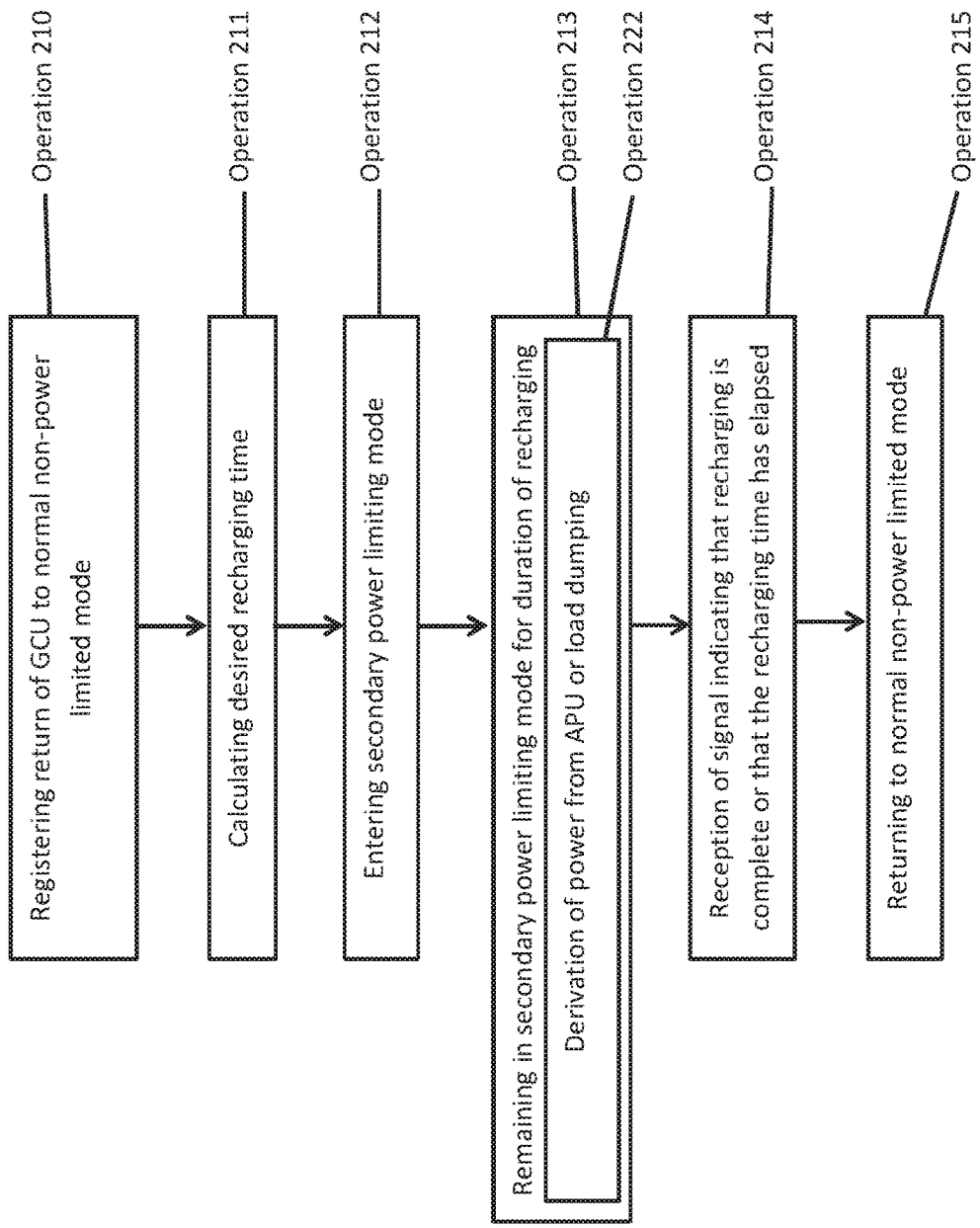
FIG. 5 is a flow diagram illustrating a secondary method of operating an aircraft electrical system in accordance with embodiments.

With reference to FIG. 5, following the return of the GCU to its normal non-power limited mode of operation 205, the method may further include a secondary method of battery recharging. This secondary method will recharge the battery associated with the previously operative engine that is now depleted by the above-described cross-start action of the previously non-operative engine in which limited power was drawn from the generator by the GCU and the remaining power needed for the cross-start action was drawn from the battery.

The secondary method includes registering the return of the GCU to its normal non-power limited mode of operation 205 (operation 210) and calculating a desired recharging time (operation 211). In accordance with embodiments, the desired recharging time may be predefined or associated with a specified mission of the aircraft 10. That is, the desired recharging time may vary based on multiple factors and conditions. In any case, the secondary method continues with the GCU of the previously operative engine entering a secondary power limiting mode (operation 212) in response to the registration and remaining in the secondary power limiting mode for the duration of the recharging (operation 213). The secondary method concludes upon reception of a signal indicating that the recharging is complete or that the recharging time has elapsed (operation 214) and a return of the GCU to its normal non-power limited mode (operation 215).

Figure 6:
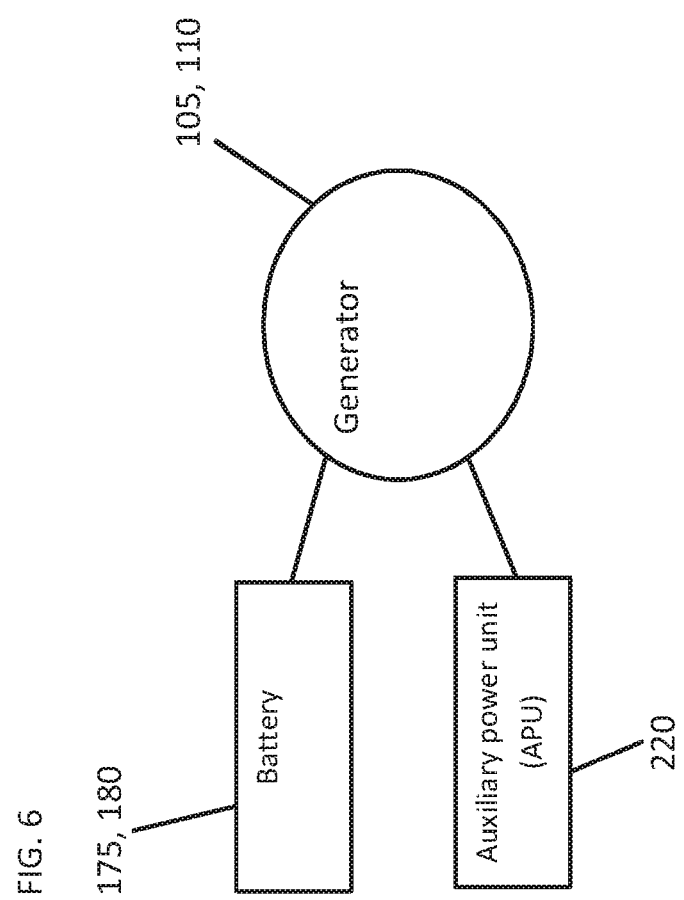
FIG. 6 is a schematic diagram illustrating further components of the electrical system of FIG. 2.

In accordance with further embodiments and, with reference to FIGS. 4, 5 and 6, it will be understood that the electrical system 100 of FIG. 2 may further include an auxiliary power unit (APU) 220 that is connected to each of the generators 105, 110 in parallel with the batteries 175, 180. With this additional feature, the method and the secondary method may both include additional hybrid operations whereby the GCUs execute load dumps or derive additional power for various operations from the APUs 220. For example, as shown in FIG. 4, the method may include execution of a load dump of non-essential loads (i.e., electrical power systems dedicated to passenger comfort) during the duration of the cross-start action of operation 203 (operation 221). Thus, even in the power limiting mode, the generator of the previously operative engine may have sufficient power to execute the cross-start action without the need to deplete the battery to a substantial degree. In this case, the substantial degree may be predefined or associated with a specified mission of the aircraft 10. As another example, as shown in FIG. 5, where a mission profile requires a fast recharging of the depleted battery, the secondary method may include a derivation of power from the APU 220 and a load dump of non-essential loads during the recharging of operation 213 (operation 222). Thus, even in the secondary power limiting mode, the combination of the generator of the previously operative engine and the APU 220 may have sufficient power to execute the recharging of the depleted battery in the time required by the mission profile.

In accordance with further embodiments, the generators 105, 110 may be configured to normally distribute about 28V of DC power. However, during the power limiting mode and the secondary power limiting mode, the generators 105, 110 will be operative at reduced voltages by the GCUs 125, 130. These reduced voltages may be discrete or gradual to maintain a generator power output limit. In the former case, the reduced voltages may be predefined at 28V to as low as 16V and then to as low as 10V, for example. In each case, any load dumps executed by the GCUs 125, 130 will be designed with the effective voltage considered. That is, the load dump in the 10V instance will be more severe than the load dump in the 16V instance. Particularly, the load dump in the 16V instance may only relate to non-essential loads whereas the load dump in the 10V instance may relate to the non-essential loads and essential loads (i.e., window wiping systems and search light systems).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of operating an electrical system of an aircraft, the method comprising:
    initiating a cross-start action for cross-starting a non-operative engine using a generator of an operative engine;
    entering a power limiting mode of a generator control unit (GCU) of the operative engine, the power limiting mode of the GCU reducing an amount of power that can be pulled off of the operative engine;
    remaining in the power limiting mode for a duration of the cross-start action; and
    returning to the non-power limiting mode of the GCU of the operative engine upon completion of the cross-start action.

2. The method according to claim 1, wherein the entering of the power limiting mode comprises:
    deriving from a battery associated with the operative engine any additionally needed power for the cross-start action exceeding power that can be drawn from the operative engine.

3. The method according to claim 1, further comprising load dumping during the duration of the cross-start action.

4. The method according to claim 1, further comprising deriving power from an auxiliary power unit (APU) for the cross-start action.

5. The method according to claim 1, wherein a secondary method comprises recharging a depleted battery.

6. The method according to claim 5, wherein the secondary method comprises:
    registering a return to a normal non-power limited GCU mode;
    calculating a recharging time;
    entering a secondary power limiting GCU mode in response to the registration;
    remaining in the secondary power limiting GCU mode for a recharging duration; and
    returning to a normal non-power limited GCU mode upon completion of the recharging.

7. The method according to claim 5, further comprising load dumping during the duration of the cross-start action.

8. The method according to claim 5, further comprising deriving power from an auxiliary power unit (APU) for the cross-start action.

9. The method according to claim 1, further comprising discretely reducing a generator voltage to maintain a generator power output limit.

10. The method according to claim 9, further comprising discretely reducing a generator voltage from about 28 volts to as low as 16 volts and from 16 volts to as low as 10 volts.

11. The method according to claim 1, further comprising gradually reducing a generator voltage to maintain a generator power output limit.

12. An aircraft, comprising: an airframe; main and tail rotors disposed on the airframe; engines supportively disposed on the airframe to drive rotations of the main and tail rotors; and an electrical system configured to initiate a cross-start action for cross-starting a non-operative one of the engines using a generator of an operative one of the engines, to enter a power limiting mode of a generator control unit (GCU) of the operative engine, the power limiting mode of the GCU reducing an amount of power that can be pulled off of the operative engine, to remain in the power limiting mode for a duration of the cross-start action and to return to the non-power limiting mode of the GCU of the operative engine upon completion of the cross-start action.

13. The aircraft according to claim 12, wherein the entry of the power limiting mode by the electrical system comprises reducing an amount of power that can be pulled off of the operative engine and deriving from a battery associated with the operative engine any additionally needed power for the cross-start action exceeding power that can be drawn from the operative engine.

14. The aircraft according to claim 12, wherein the electrical system is further configured to recharge a depleted battery.

15. The aircraft according to claim 14, wherein the recharging comprises registering a return to a normal non-power limited GCU mode, calculating a recharging time, entering a secondary power limiting GCU mode in response to the registration, remaining in the secondary power limiting GCU mode for a recharging duration and returning to a normal non-power limited GCU mode upon completion of the recharging.

* * * * *